W. GEARY.
Pot-Lid.
No. 204,810. Patented June 11, 1878.
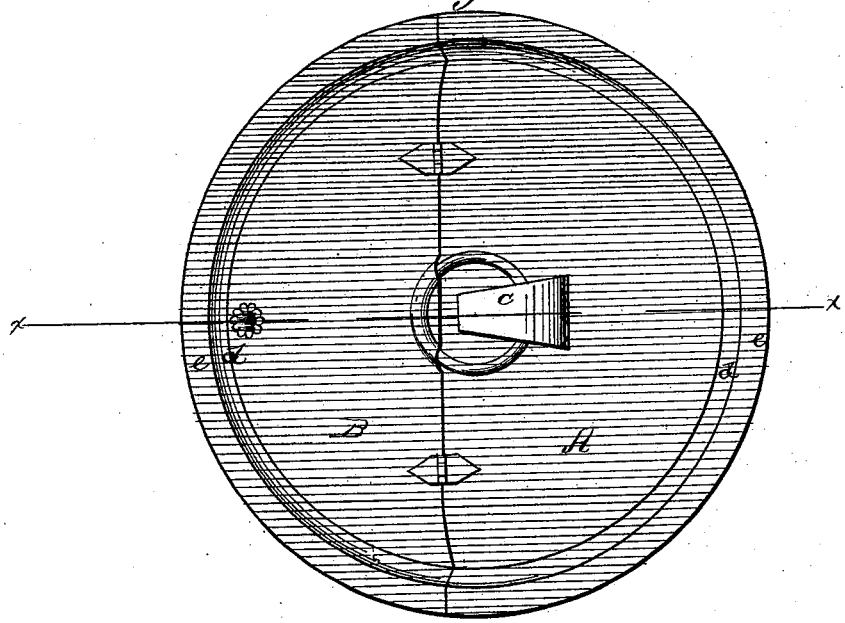
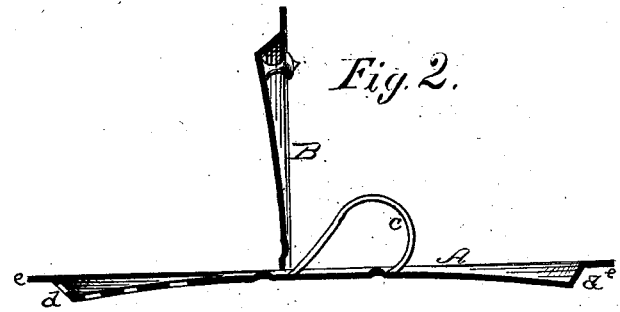
Witnesses:
W. C. McArthur
E. L. Everts
Inventor:
Wm. Geary,
per T. H. Alexander & Elliott
Attorneys.

UNITED STATES PATENT OFFICE.

WILLIAM GEARY, OF FORT WAYNE, INDIANA.

IMPROVEMENT IN POT-LIDS.

Specification forming part of Letters Patent No. 204,810, dated June 11, 1878; application filed April 22, 1878.

*To all whom it may concern:*

Be it known that I, WILLIAM GEARY, of Fort Wayne, in the county of Allen and State of Indiana, have invented certain new and useful Improvements in Pot-Lids; and I do hereby declare that the following is a full, clear, and exact description thereof, reference being had to the accompanying drawings, and to the letters of reference marked thereon, which form part of this specification, in which—

Figure 1 is a plan of my lid with the hinged top closed; and Fig. 2, a section, showing the hinged top open.

The nature of my invention consists in the peculiar construction and arrangement of the lid, cover, and handle, as will be hereinafter more fully set forth.

In order that others skilled in the art may make and use my invention, I will now proceed to describe its construction and operation.

A represents the lid, which may be struck up to give a concave surface on its top and a convex surface on its bottom, having a flange or projection, $e$, around its periphery. This flange is intended to rest on the top of the pot or vessel which it is designed to cover, while the sloping or inclined periphery $d$ will adapt the lid to fit tightly over the mouth of a smaller or larger vessel. About one-third (more or less) of the lid is perforated, and over these perforations is hinged the cover B, as seen in the drawings. Of course, the cover should be made to conform to the upper surface of the lid, so that the pot may be entirely closed when desirable.

It will be observed that I also perforate the inclined or spring periphery of the lid.

$c$ represents a handle, against which the cover may rest when thrown back.

It will thus be observed that the surplus steam may escape from the pot and prevent the water from boiling over. The water may also be poured off without removing the lid, which acts at the same time as a strainer. While this operation is going on the hinged cover B protects the hand from the hot steam.

I am fully aware that the broad idea of having perforations in a lid, the same being covered by a flap, is not new, and therefore lay no claim to this feature; but What I do claim, and desire to secure by Letters Patent, is—

The within-described lid, formed with the concave top surface, and having perforations therein and also in the rim, and provided with hinged cover B and the depressed handle $c$, all constructed and arranged as herein shown, and for the purpose set forth.

In testimony that I claim the foregoing as my own I affix my signature in presence of two witnesses.

WILLIAM GEARY.

Witnesses:
JAMES C. BEEKS,
J. Q. STRATTON.